United States Patent [19]
Olper et al.

[11] Patent Number: 5,618,507
[45] Date of Patent: Apr. 8, 1997

[54] PROCESS FOR REMOVING $SO_2$ FROM GASES WHICH CONTAIN IT, WITH DIRECT PRODUCTION OF ELEMENTAL SULFUR

[75] Inventors: Marco Olper, Monza; Massimo Maccagni, Sesto San Giovanni, both of Italy

[73] Assignee: Engitec S.p.A., Milan, Italy

[21] Appl. No.: 603,556

[22] Filed: Feb. 21, 1996

[30] Foreign Application Priority Data

Feb. 24, 1995 [IT] Italy .................................. MI95A0357

[51] Int. Cl.$^6$ ........................................... B01D 53/50
[52] U.S. Cl. .............................. 423/243.08; 423/566.3; 423/571; 423/574.2
[58] Field of Search ........................ 423/243.08, 243.01, 423/562, 563, 574.2, 170, 166, 566.3, 578.1, 578.2, 571

[56] References Cited

U.S. PATENT DOCUMENTS

| | | | |
|---|---|---|---|
| 3,784,680 | 1/1974 | Strong et al. | 423/571 |
| 4,078,048 | 3/1978 | Nadkarni | 423/571 |
| 4,100,260 | 7/1978 | Elston | 423/242 |
| 4,937,057 | 6/1990 | Talonen et al. | 423/220 |

FOREIGN PATENT DOCUMENTS

| | | | |
|---|---|---|---|
| 2122955 | 11/1994 | Canada. | |
| 0205976A3 | 12/1986 | European Pat. Off.. | |
| 0205976 | 12/1986 | European Pat. Off. | 423/243.08 |
| 3523073A1 | 1/1986 | Germany. | |
| 4415975 | 11/1994 | Germany | 423/574.2 |
| 15635 | 6/1926 | Netherlands | 423/562 |

*Primary Examiner*—Gary P. Straub
*Assistant Examiner*—Timothy C. Vanoy
*Attorney, Agent, or Firm*—Cushman Darby & Cushman IP Group of Pillsbury Madison & Sutro LLP

[57] ABSTRACT

A wet process of regenerative type for removing $SO_2$ contained in combustion gases in which $SO_2$ is caused to be absorbed by a diluted aqueous solution of BaS, with a mixed precipitate of elemental S, $BaSO_3$ and $BaSO_4$ being formed by the consequent reactions. Sulfur is extracted from the precipitate—recovered by filtration—by using a solution of $(NH_4)_2S$; the resulting polysulfide is distilled, with pure elemental S and the solution of $(NH_4)_2S$ to be recycled, being obtained. The residual mixture of $BaSO_3$ and $BaSO_4$ remaining after sulfur extraction is reduced with coal in a high temperature furnace, in order to obtain BaS to be recycled, as an aqueous solution, to the $SO_2$ absorption step.

7 Claims, 1 Drawing Sheet

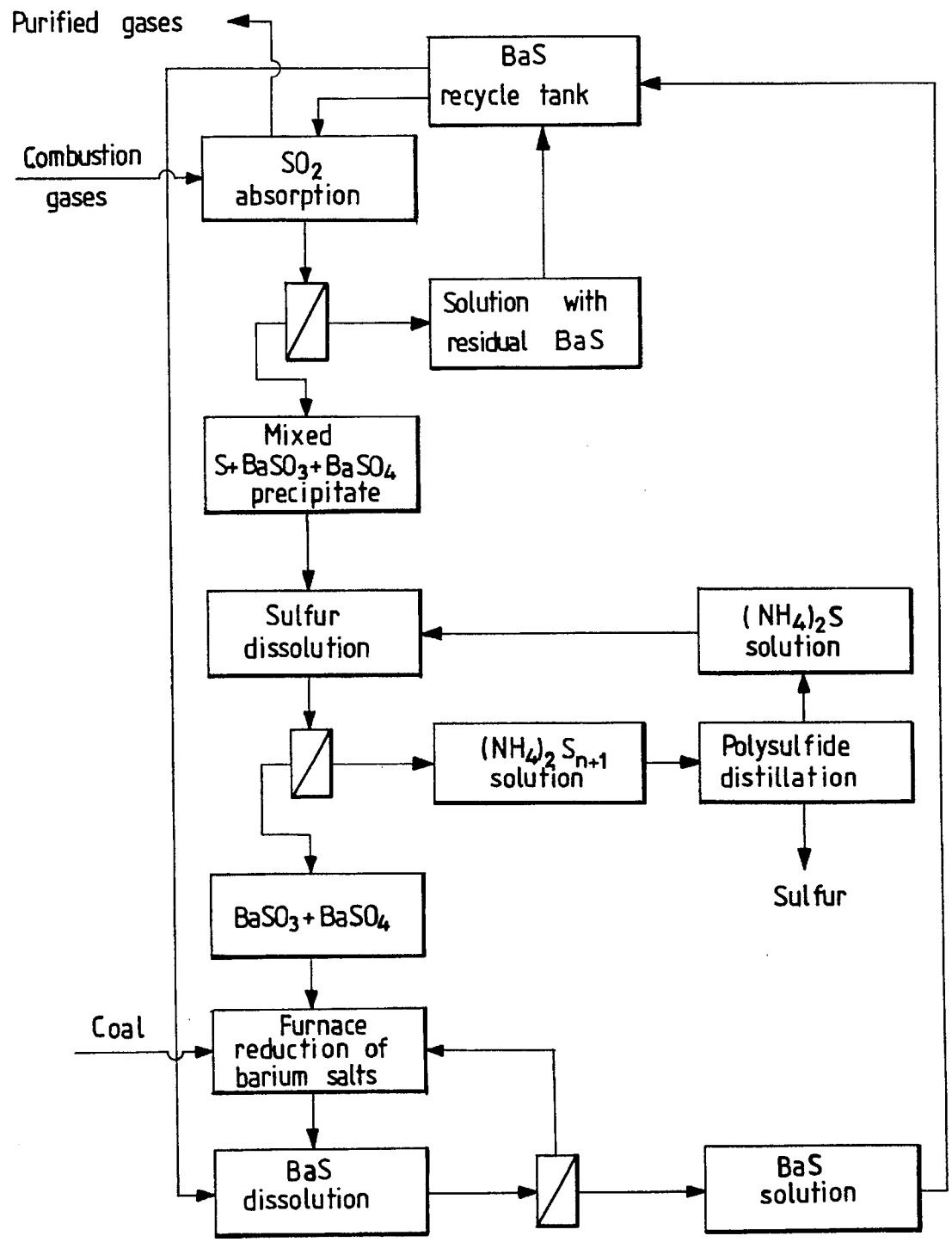

PROCESS FOR REMOVING SO₂ FROM GASES WHICH CONTAIN IT, WITH DIRECT PRODUCTION OF ELEMENTAL SULFUR

BACKGROUND OF THE INVENTION

In the flue gases generated by the large facilities which burn coal or fuel oil, in particular power generation plants, the concentration of $SO_2$ is relatively low, but, on considering the enormous gas volumes discharged to the atmosphere, the amounts of $SO_2$, on an absolute basis, reach environmentally unacceptable levels. Installing sulfur removing units in these facilities has been a need for years, and is now also imposed by law.

The flue gases from sulfur containing metal ore roasting facilities are presently sent to $H_2SO_4$ productions, but owing to the present difficulty met in selling the latter, an alternative process which converts $SO_2$ from exhaust gases into elemental sulfur rather than into $H_2SO_4$ could contribute to solve the marketing problems.

The solutions offered by the prior art for flue gases desulfurization are substantially two:

the limestone/chalk processes which convert $SO_2$ into a solid residue comprised of calcium sulfate/sulfite which must be disposed of in specially designed areas, the regenerative processes which convert $SO_2$ into marketable sulfur forms, and do not generate residues to be disposed off. These processes are the only ones which are completely acceptable from a strict environmental protection view point, but involve decidedly higher investment and operating costs, even if these operating costs may be partially compensated for by the income deriving from sales of sulfur, liquid and/or $H_2SO_4$, produced by the same processes.

At present, on a practical basis the processes of the first type, in which removal of $SO_2$ is based on the reaction of the latter with a suspension of lime/chalk, are more widely diffused. The exhaust gases from the boilers are caused to flow through a wash tower in which they are contacted, in countercurrent, with a slurry containing lime/limestone, kept continuously recycled and subdivided into extremely fine droplets in order to favor the intimate contact thereof with the gas and, consequently, $SO_2$ absorption.

Calcium sulfite and sulfate are formed, which are usually converted into a homogeneous product by means of an end oxidation.

The yields of $SO_2$ extraction may reach 90%.

The reactant consumptions are always largely higher than the stoichiometric amounts, owing to the low solubility of lime and chemical inertness of limestone.

Among this type of processes, in particular the Babcock-Hitachi, Combustion Engineering, Costain Deutsche Babcock and Lodge Cottrel processes have been successfully adopted.

An analogous process is the double-alkali process, which is based on $SO_2$ absorption by a sodium carbonate solution.

The extraction yield is good (about 90%), the reactant consumption practically corresponds to the stoichiometric requirements, the process management is relatively simple, but for partial alkali regenerations the treatment with lime is used, so also in this case calcium sulfite and calcium sulfate are formed which, together with the excess of lime, must be disposed off to landfill.

Among the regeneration processes, the Wellman-Lord process, using the sulfite-bisulfite system, gained a leading position. Due to the effect of absorbed $SO_2$, the absorbent sodium sulfite solution is converted into bisulfite and can be thermally regenerated; sodium sulfite is formed again and an $SO_2$ stream is released which has a high enough concentration for the subsequent alternative treatments:

transformation into sulfur by the Claus process;

liquefaction to produce liquid $SO_2$;

conversion into $H_2SO_4$ by the contact method.

The absorption step is carried out in an absorption tower, with a removal yield which usually is higher than 90%. The sulfite regeneration is carried out inside a forced-circulation evaporator.

During the absorption step, a portion of sulfite is converted into sulfate, so from this process also, this product is obtained, together with $SO_2$.

The investment cost is high, facility management is complex.

Also the process based on use of Mg oxide developed by Philadelphia Electric/UE&C is a wet-type regenerative process; for the absorption, a suspension of MgO in water is used; Mg sulfite is formed which can be decomposed by calcination into MgO and $SO_2$ (also $MgSO_4$, which is also partially formed during the absorption step, can be reduced to MgO and $SO_2$ if the calcination is carried out in the presence of coal).

Therefore, the only product obtained is a concentrated $SO_2$ stream, which can be submitted to the usual treatments yielding commercial grades of this product.

The investment cost is high and the process management is quite complex.

The citrate process uses, for desulfurization, a solution of citric acid and sodium citrate. This solution is an extremely good absorbant for $SO_2$, because it acts as a pH buffering agent. The wash solution enriched with $SO_2$ is sent to a reactor in which it is reacted with $H_2S$ (obtained by recycling a portion of produced sulfur and causing it to react with fuel gas in an adjacent facility), so as to form a slurry containing 10% of elemental S.

The high-purity sulfur is separated from the solution which is sent back to the absorption step. The presence of sodium sulfate which is formed by oxidation during the absorption makes it for a purge to be carried out in order to remove it.

Therefore, the process products are sulfur and sodium sulfate.

The high investment cost and the complexity of process management have limited the diffusion thereof.

For the sake of completeness, the following should be cited as well:

the method taught by U.S. Pat. No. 3,475,122, using 3-compartment electrolysis cells for producing NaOH for $SO_2$ absorption and acid for neutralizing the basic solution saturated with $SO_2$, with $SO_2$ being consequently released; and the process taught by U.S. Pat. No. 4,107,015, in which the $SO_2$-saturated alkaline solution is charged to an electrodialysis membrane separation unit; from the acidic compartments a solution is obtained which is suitable for $SO_2$ stripping, and from the basic compartments a solution is obtained which contains the necessary NaOH for absorbing further amounts of $SO_2$.

All the above described regenerative processes aim at obtaining a concentrated enough $SO_2$ stream to be suitable for being converted, by means of a downstream facility, into a marketable product (liquid $SO_2$, $H_2SO_4$ or elemental sulfur).

SUMMARY OF THE INVENTION

The present invention aims at jointly accomplishing the purposes of providing a process for desulfurization of combustion gases which:

- directly produces elemental S, a substance which is in great demand by the market, and is easy to be stored;
- reduces the number of steps and of the necessary equipment units;
- is easily operated and controlled, with low operating costs;
- does not produce any substances which may require being further processed in order to be rendered useable, and does not produce wastes to be disposed of.

The present invention provides a method, wherein, in step (a), as the absorbent means a diluted barium sulfide solution is used which, by reacting with $SO_2$, causes elemental sulfur to be directly formed and yields practically insoluble barium salts (i.e., barium sulfite and sulfate).

The reactions between $SO_2$ and the solution take place at a very high reaction rate; $SO_2$ removal is practically complete: and the separation of the precipitate from the solution, carried out by filtering, is easy and fast.

As regards step (b), the reactant acting as a solvent for sulfur and leaving unchanged any barium salts present, can advantageously be an aqueous solution of ammonium sulfide. The saturated sulfur solution which is obtained from this step can be regenerated, without difficulties, by distillation, and the resulting product is a particularly pure sulfur.

As regards step (c), barium sulfite and sulfate, after being separated from sulfur, are mixed with the necessary coal for reducing them into barium sulfide; the reduction step is carried out in a furnace at 1000° C. The product, consisting of fine particles, is easy leached.

As solvent solution, a portion is used of the same solution circulating through the absorption tower; before being recycled the solution is submitted to a preliminary filtration.

BRIEF DESCRIPTION OF THE DRAWING

In order to better understand the characteristics and advantages of the invention, the process of the invention, as substantially defined hereinabove, is disclosed in the following in greater detail by referring to the flow diagram shown in FIG. 1, the sole figure of the accompanying drawing.

DETAILED DESCRIPTION

The gases to be purified are fed to the bottom of an absorption tower, in which they come into intimate contact with an aqueous BaS solution sprayed from tower top-side, in the form of extremely fine droplets. Such a solution is an active desulfurizing agent at both high and low concentrations. Inside the tower, both of the following reactions take place rapidly after each other:

$$2BaS + 2SO_2 + 2H_2O \rightarrow 2BaSO_3 + 2H_2S \quad (1)$$

$$2H_2S + SO_2 \rightarrow 3S + 2H_2O \quad (2)$$

leading to the global reaction:

$$2BaS + 3SO_2 \rightarrow 2BaSO_3 + 3S \quad (3)$$

Together with $BaSO_3$ and S in the precipitate, also an amount of 1–20% of $BaSO_4$ is found, which is formed from sulfite owing to the oxidizing action of air contained in the gas stream. In the process, the presence of $BaSO_4$ together with $BaSO_3$ does not cause any difficulties, because it is reduced to BaS simultaneously to sulfite reduction.

In order to separate the mixed precipitate from the BaS-depleted solution, that solution is submitted to filtration. The filtration step is fast and easy, thanks to the crystal character of the precipitated substances and thanks to their amounts participating in the process, which are the minimum compatible with the level of $SO_2$ in the treated gases.

By means of this separation, the solution which contains unreacted BaS can be returned back to the absorbent solution recycle tank, whilst the mixed precipitate is sent to the dissolver for sulfur extraction.

For that purpose, a solution containing 10% $(NH_4)_2S$ is preferably used in a solid:solution ratio which is preferably of 1:4, according to the reaction:

$$(NH_4)_2S + nS \rightarrow (NH_4)_2S_{n+1} \quad (4)$$

The dissolution of sulfur, with polysulfide formation, is complete at room temperature within approximately 30 minutes. The slurry is filtered with a cake of barium sulfur salts (which are sent to the regeneration) and a clear polysulfide $(NH_4)_2S_{n+1}$ solution (which is sent to distillation), being obtained.

From the distillation, the following products are obtained:

- a solution of $(NH_4)_2S$ to be recycled to dissolve further sulfur amounts;
- elemental sulfur, which can be processed to a marketable form.

The distillation of polysulfide solution restores, with no losses, the initial sulfide solution, and makes it possible for sulfur to be obtained at a rather high purity level.

The regeneration of the absorbent means is the end process step. In this step, barium sulfite and sulfate are reduced to sulfide.

The reactions which can take place inside the reduction furnace respectively yield CO and $CO_2$.

For sulfite:

$$2BaSO_3 + 3C \rightarrow 2BaS + 3CO_2 \quad (5)$$

$$BaSO_3 3C \rightarrow BaS + 3CO \quad (6)$$

For sulfate:

$$BaSO_3 + 2C \rightarrow BaS + 2CO_2 \quad (7)$$

$$BaSO_4 + 4C \rightarrow BaS + 4CO \quad (8)$$

Actually, the representative reaction is half-way between both above results, so, by combining the latter reactions with the overall reaction which takes place in the absorption step, the overall process according to the present invention can be summarized by means of the following reactions:

$$SO_2 + C \rightarrow S + CO_2 \quad (9)$$

$$SO_2 + 2C \rightarrow S + CO_2 \quad (10)$$

Summing-up, the overall process consists in converting $SO_2$ into sulfur and carbon oxides. In order to reduce barium sulfur compounds to barium sulfide, barium sulfite and sulfate, admixed with 20% of coal powder, are charged to a furnace, in which they are kept 1 hour at 1100° C.

The product is in powder (granular) form, and can be directly Leached with the same solution from the recycle tank. The BaS enriched solution is filtered in order to retain any coal and possibly unreacted sulfite. The filter cake is sent back to the furnace and the clear solution is fed back to the recycle tank, in order to get a homogeneous composition solution, and, from there, to the absorption tower.

A non-limitative example of practical implementation of the process of the invention is disclosed now.

After some process tests, the following raw materials were available:

exhausted absorption solution containing 3.55 g of $Ba^{2+}$/liter, in sulfite form, correspondingly to its solubility, a powder material coming from the furnace reduction of barium sulfur salts, containing:

72.66% of BaS
24.68% of $BaSO_3$
2.66% of $BaSO_4$ and inerts

An amount of 15 g of the above powder was dissolved in 250 ml of exhausted absorption solution and, after a 30-minute stirring, the mixture was filtered: 4.1 g and 250 ml of undissolved residue and, respectively, of solution containing 43.6 g of BaS/l, were obtained.

Through this solution, $SO_2$ (produced by means of a Kipp device, in which $Na_2S_2O_5$ with $H_2SO_4$ were reacted), was bubbled.

The solution turned immediately turned hazy; the precipitate turned pale yellow, and, during the test, this color turned first white and then, again, pale yellow. $SO_2$ was fed until no BaS was present any longer in solution. Then, the feed was discontinued, and the precipitate was filtered, washed and dried.

Against a theoretical weight of 17.08 g, calculated according to the overall reaction of the absorption step, an amount of 16.1 g was obtained (yield 94.3%).

In the solution obtained from this test, a further 18.1 g of available powder was dissolved.

After a 30-minute stirring, the solution was filtered, with 4.9 g of undissolved residue and 250 ml of solution with 52.8 g of BaS/l, being obtained.

Like in the preceding test, through the solution $SO_2$, produced by means of the Kipp apparatus, was bubbled, until the solution did not contain BaS any longer. Then, the feed of $SO_2$ was discontinued, the solution was filtered and the precipitate was washed, dried and weighed.

Against a theoretical weight of 20.69 g, as computed above, 19.9 g was obtained (yield 96.2%). In the 250 ml of exhausted solution, 3.37 g of $Ba^{2+}$/liter was still present, as sulfite.

Both precipitates from the preceding tests, the total weight of which was of 36 g, were treated at room temperature for 30 minutes, with 150 ml of a solution containing 100 g of $(NH_4)_2S$/liter.

The weight of the undissolved white residue was 29.5 9, after being washed and dried, and the material was ready for being submitted to reduction in the furnace (the so-said "absorbant regeneration").

The extraction solution was distilled and from it 130 ml of $(NH_4)_2S$ solution and 6.35 g of pure sulfur were recovered.

29.5 g of a white precipitate obtained after sulfur extraction, blended with 5.9 g of coal powder, were charged to a graphite crucible, and were covered with 1 g of coal powder. The crucible was kept at 1100° C. for 1 hour in a muffle furnace.

The product from the reduction step weighed 24.5 g and had the following composition:

| | | |
|---|---|---|
| BaS | 19.3 g | 78.77% |
| $BaSO_3$ | 4.7 g | 19.19% |
| $BaSO_4$ and inerts | 0.5 g | 2.04% |
| | 24.5 g | 100.00% |

The reduction yield was low (83.9%), but this is of no moment in regard to the purposes of the process, because any unreacted sulfite is returned back to the reduction furnace with the subsequent batch.

From the above, the advantages of the process according to the present invention over the techniques known from the prior art will be evident:

the process yields one single product, i.e., pure sulfur, always marketable, easy stored, of well-defined value, the production of the sulfur takes place directly during the first process step, i.e., during $SO_2$ absorption. Neither further products to be reprocessed, nor waste materials to be disposed of, are generated, the operations are few and straight. The investment costs can be contained, the high gas desulfurization rate is secured by the strong reactivity of the selected absorbant, the dilution of the used solutions, the type and speed of the reactions implied in the absorption.

We claim:

1. A process for removing sulfur dioxide from a gas which contains it, comprising the steps of:

(a) reacting an $SO_2$-containing gas with an aqueous solution into which BaS has been supplied according to the reactions:

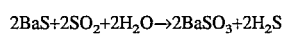
   $2BaS+2SO_2+2H_2O \rightarrow 2BaSO_3+2H_2S$

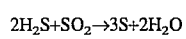
   $2H_2S+SO_2 \rightarrow 3S+2H_2O$ with a precipitate being thus formed which comprises $BaSO_3$ and S, and filtering-off said precipitate, (b) dissolving elemental sulfur from said filtered-off precipitate, while leaving the $BaSO_3$ unchanged, in a solid residue, and separting the resulting solution from said solid residue, (c) treating said solid residue from (b) with elemental carbon at a temperature of approximately 1100° C., according to reactions including:

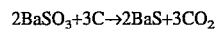
   $2BaSO_3+3C \rightarrow 2BaS+3CO_2$

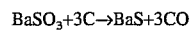
   $BaSO_3+3C \rightarrow BaS+3CO$ and supplying the BaS solids into the absorption solution and recycling this resulting absorption solution to step (a);

(d) distilling said resulting solution obtained in step (b) to recover elemental sulfur in pure form.

2. The process according to claim 1, wherein:

in step (b) elemental sulfur is dissolved from said filtered-off precipitate using an aqueous solution of ammonium sulfide $(NH_4)_2S$ according to the reaction:

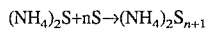

with a solution of polysulfide $(NH_4)_2S_{n+1}$ being obtained and said distilling in step (d), produces said aqueous solution of ammonium sulfide $(NH_4)_2S$ for use in step (b).

3. The process according to claim 1, wherein:

barium sulfate $BaSO_4$ is formed as a consequence of conducting step (a), and upon completion of step (b) remains in said solid residue.

4. The process according to claim 3, wherein:

in step (c), said reactions also include:

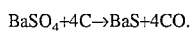

5. The process according to claim 1, further including:

carrying out said treating of step (c) in a furnace, using coal powder as said elemental carbon.

6. The process according to claim 5, further comprising:

filtering said absorption solution formed in step (c) to remove unreacted barium sulfite and coal, and recycling the removed unreacted barium sulfite and coal to step (c).

7. The process according to claim 1, further comprising feeding the solution obtained upon filtration of the precipitate formed in step (a), back to step (a) through a recycle tank.

* * * * *